US012811488B2

(12) United States Patent

Heragu Singaiyengar et al.

(10) Patent No.: US 12,811,488 B2
(45) Date of Patent: Nov. 24, 2026

(54) SINGLE-INDUCTOR MULTIPLE-OUTPUT DC-DC CONVERTER WITH LOW-CROSS REGULATION AND CORRESPONDING METHOD OF OPERATING

(71) Applicant: Semtech Corporation, Camarillo, CA (US)

(72) Inventors: Aravind Prasad Heragu Singaiyengar, Renens (CH); Eric Vandel, Concise (CH)

(73) Assignee: Semtech Corporation, Camarillo, CA (US)

( * ) Notice: Subject to any disclaimer, the term of this patent is extended or adjusted under 35 U.S.C. 154(b) by 178 days.

(21) Appl. No.: 18/538,994

(22) Filed: Dec. 13, 2023

(65) Prior Publication Data

US 2024/0204646 A1 Jun. 20, 2024

(30) Foreign Application Priority Data

Dec. 15, 2022 (EP) .................................... 22213959

(51) Int. Cl.
*H02M 3/158* (2006.01)
*H02M 1/00* (2006.01)

(52) U.S. Cl.
CPC ......... *H02M 1/009* (2021.05); *H02M 1/0009* (2021.05); *H02M 3/1582* (2013.01)

(58) Field of Classification Search
CPC ............................ H02M 3/1582; H02M 1/009
See application file for complete search history.

(56) References Cited

U.S. PATENT DOCUMENTS

| | | | | |
|---|---|---|---|---|
| 10,622,900 | B1 * | 4/2020 | Wei | H02M 3/1584 |
| 2004/0201281 | A1 * | 10/2004 | Ma | H02M 3/158 307/38 |
| 2021/0119533 | A1 * | 4/2021 | Liang | H02M 1/14 |
| 2021/0281173 | A1 * | 9/2021 | Eirea | H02M 3/158 |

* cited by examiner

*Primary Examiner* — Peter M Novak
(74) *Attorney, Agent, or Firm* — BLANK ROME LLP

(57) ABSTRACT

A single-inductor multiple-output (SIMO) DC-DC converter is operated cyclically. The single inductor is energized then discharged following a series of consecutive time segments with a duration predetermined prior to the start of each cycle of operation, based on a sum of the set of currents suppliable to the plurality of loads. It combines a simple structure with a low incidence of cross-regulation issues.

15 Claims, 5 Drawing Sheets

SINGLE-INDUCTOR MULTIPLE-OUTPUT DC-DC CONVERTER WITH LOW-CROSS REGULATION AND CORRESPONDING METHOD OF OPERATING

REFERENCE DATA

The present application claims priority from European patent application EP22213959, filed on Dec. 15, 2022, Publication No. EP4387073A1, the content whereof are hereby incorporated in their entirety.

TECHNICAL DOMAIN

The present invention concerns a single-inductor multiple-output (SIMO) DC-DC converter and a method for operating a SIMO DC-DC converter. Preferably, the present invention's SIMO DC-DC converter is operated with the said method.

RELATED ART

DC to DC converters are well-known from the prior art. Conventional DC-DC converters convert a source of direct current (DC) from one voltage level to another voltage level. The power convertible by DC-DC converters ranges from very low power of a few milliwatts to very high power of some megawatts. SIMO DC-DC converter architectures are a special class of DC-DC converters, as they can provide multiple output voltage levels while being supplied from one single DC source supplying a single DC voltage. The outputs of a single SIMO DC-DC converter stage can supply correspondingly multiple loads.

SIMO DC-DC converters have gained much attention in recent years, especially for very low power applications, such as in consumer electronic devices. SIMO DC-DC converters provide highly power efficient conversion while being space-efficient simultaneously. Both attributes are highly desirable for very low power applications, particularly where space is limited and/or where power conversion losses lead to a significant reduction of the operability of electronic devices. Providing multiple outputs for supplying loads with different voltages does bring not only advantages but also disadvantages. One of the major drawbacks is that every single output and the corresponding voltage needs to be precisely controlled. This can be demanding, in particular in operational situations where loads can vary erratically. Solutions known from the art to prevent or reduce the impact of load variations are often less energy efficient and/or drastically increase the space required for the implementation. Known solutions also add further complexity to SIMO DC-DC converters, which is desirable to be avoided for SIMO DC-DC converters destined for the mass market.

An object of the present invention is the provision of a SIMO DC-DC converter and a related method for the operation of the said converter that overcomes the shortcomings and limitations of the state-of-the-art. The SIMO DC-DC converter provides, inter alia, the advantage of reducing or avoiding cross-regulation issues caused by load variation at one output end affecting other output ends without affecting the conversion efficiency or quality. On the other hand, the SIMO DC-DC converter remains small in size and is therefore suitable for being produced in high volumes without significantly increasing the costs.

SHORT DISCLOSURE OF THE INVENTION

According to a first aspect of the present invention, a SIMO DC-DC converter is disclosed, involving the features recited in claim 1. Further features and embodiments of the SIMO DC-DC converter of the present invention are described in the dependent claims.

The inventive converter operates between an electrical DC voltage source and a plurality of loads, which are not part of the converter itself, The DC voltage is transferred to an input node by an input switch, while the loads are connected through one corresponding output switch, branching from a common output node. The single inductor is connected to the input node and the output node and is configured to buffer energy. The action of the converter is governed by a control structure configured to operate in consecutive cycles and generate control signals for the input switch and the output switches. In each cycle, the inductor is energized and de-energized following a series of consecutive time segments to provide the desired voltage to the loads. The duration of the segments is determined in advance at each start of a cycle based on a sum of the set of currents suppliable to the plurality of loads.

The control structure can be configured to generate control signals for the input switch and the output switches, such that the set of currents can be exclusively supplied to the plurality of loads within the cycle of operation in a different than the one time segment. Alternatively, or in addition, the control structure can be configured to generate control signals for the input switch and the output switches, such that a total amount of energy suppliable to the plurality of loads can be buffered in the inductor in the form of magnetic energy in the said one time segment.

In simple terms and with the necessary simplification, the SIMO DC-DC converter can be configured to operate in cycles, wherein in one cycle of operation, the inductor can be energized by connecting the inductor to the DC voltage source and de-energize by connecting the inductor sequentially to a plurality of outputs. The time in which the inductor can be energized in one cycle of operation can be determined prior to the one cycle of operation. The time for energizing the inductor can be determined based on the total amount of currents demanded by the plurality of loads, wherein each load can be connected to one output. In summary, the inductor can buffer the total amount of energy that is required to be supplied to the various outputs (and loads) in one cycle of operation and thus can take any load variation into account prior to the execution of the cycle of operation. This measure, alone or in combination with the other features as outlined before, helps to reduce or omit cross-regulation issues caused by any load variation. The term cycle of operation or operation cycle is commonly used in the field of pulse width modulation and can correspond to a time or pulse period. The term switchable implies that something (e.g. the voltage source), can be connected to or disconnected from something (e.g. the node). The term determining can be a synonym for calculating.

Even though it is stated before that the electrical DC voltage source and the loads can be external to the SIMO DC-DC converter, they can belong to or can be a part of the SIMO DC-DC converter. The term suppliable in the course of the present disclosure indicates, that a current can be supplied or is supplied to a load or a set of currents can be supplied or are supplied to a plurality of loads. This can refer to the circumstance that a current can only be provided to a load when the corresponding load is connected to the output node. Each load can comprise a capacitor for storing energy, preferably for storing the charge supplied to the loads by the SIMO DC-DC converter. Alternatively, or in addition, belong the said capacitors to the SIMO DC-DC converter.

The SIMO DC-DC converter can be designed for low power low voltage applications and can be capable of converting not more than 30 W, more preferably not more than 10 W of power. The related DC input voltage might not exceed 10V. The frequency in which the SIMO DC-DC converter, in particular the input switch and the output switches, can be operated preferably exceeds 1 MHz, which can lead to a cycle of operation less than 1 μs (cycle of operation correspond to one over frequency). However, the frequency can be a predetermined value taking into account the maximum ratings of the currents suppliable to the loads, the inductance of the inductor and/or the capacitance of the capacitors.

The inductor can be configured as a storage choke, capable of storing a higher amount of energy than other chokes used, for instance, for filter applications. The electrical DC voltage source can be configured as a battery or a rechargeable battery.

In a first embodiment of the first aspect of the invention, the SIMO DC-DC converter can be configured as a buck-boost converter. Preferably the buck-boost converter can be configured as a non-inverting buck-boost DCDC converter, wherein each output voltage has the same polarity as the input voltage supplied by the electrical DC voltage source. Alternatively, or in addition, the buck-boost converter can be configured to reverse the direction of the energy flow. A load can supply energy to the output node, and the energy can be shifted to the input node, for instance, for charging the electrical DC voltage source.

In a second embodiment of the first aspect of the invention, the SIMO DC-DC converter can comprise a resistor switchable connected in parallel to the inductor through an inductor switch for measuring an inductor current. For instance, the inductor switch can be closed in a freewheeling phase during one cycle of operation to measure the current flowing in the inductor. The inductors' current can be alternatively measured using a current sensor.

In a third embodiment of the first aspect of the invention, the SIMO DC-DC converter can comprise a first voltage sensor configured to determine a voltage across the resistor and a plurality of second voltage sensors, each can be configured to determine one load voltage of a plurality of load voltages. In particular, the measurement of the individual load voltages can be required by the control structure to determine the actual current demand of each load. The resistor connected to the first voltage sensor can be referred to as the freewheeling resistor.

In a fourth embodiment of the first aspect of the invention, the control structure of the SIMO DC-DC converter can be configured to operate the inductor in discontinuous or continuous conduction mode, dependent on the sum of the set of currents suppliable to the plurality of loads. The sum can also be referred to as the total amount of currents.

If one load or the plurality of loads demands a higher current, the control structure changes to the continuous conduction mode, and the cycle of operation can be started with a higher inductor current. The inductor can thus be pre-energized, such that the time for energizing the inductor can be reduced and fits into a cycle of operation. The consecutive cycles of operation can have a predetermined duration. A predetermined or preconfigured length of cycles of operation can be beneficial for the overall design of the SIMO DC-DC converter. Components necessary for filtering electromagnetic interference can be specifically selected and designed for the length of the cycle of operation (or the operational frequency).

In a further embodiment of the first aspect of the invention, the control structure of the SIMO DC-DC converter can be configured to determine the duration of further time segments based on individual currents of the set of currents suppliable to a load. This can mean that each load can be supplied with a current for a determined duration or length. The duration or length can be determined prior to the start of the cycle of operation, preferably at the same time when the duration of the one time segment for energizing the inductor is determined. Any load variation occurring during the cycle of operation can be disregarded but can be considered for the subsequent cycle of operation. As a result, the load or loads can be supplied with current(s) that were, in any case, stored in the inductor in the corresponding cycle of operation in the form of magnetic energy. This measure can contribute to the avoidance of cross-regulation issues.

In another embodiment of the first aspect of the invention, the control structure of the SIMO DC-DC converter can be arranged to energize the inductor by controlling the input switch from a non-conductive state into a conductive state and de-energize the inductor by sequentially controlling the output switches from a non-conductive state into a conductive state for supplying the loads with a set of currents within each cycle of operation, wherein the amperage of individual currents from the set of currents can be mutually different. This can mean that each load can be supplied with a current different from another current supplied to a different load in its peak value or mean value. Providing the loads with a set of currents can keep the load voltage at an almost constant level, even when capacitors with a small capacitance are used at each load.

In a different embodiment of the first aspect of the invention, the control structure of the SIMO DC-DC converter can comprise a digital controller adapted to receive the load voltages from the second voltage sensors. The digital controller can be any kind of processing means suitable to control the operation of the SIMO DC-DC converter, such as a system on a chip, a microcontroller, or a digital signal processor. Alternatively, or in addition, can some or all parts of the control structure be implemented on a field-programmable gate array.

In a further embodiment of the first aspect of the invention, the SIMO DC-DC converter can comprise a plurality of PI compensators, wherein each PI compensator can be configured to compensate for a deviation between a load voltage and a corresponding load voltage setpoint. Each PI compensator can output a value that corresponds to the actual current demanded by the individual load. This value can be determined by the deviation between the measured load voltage and the related voltage setpoint. The control structure, in particular the digital controller, can be pre configurated with a load voltage setpoint for each load. The controlled quantity can correspond to the load voltage of each load, whereby the load voltage set point can denote the related setpoints for the controlled quality. The setpoint of each load voltage can be mutually different. As said before, a current must be supplied to the related load to keep the load voltage constant and steady.

In another embodiment of the first aspect of the invention, the SIMO DC-DC converter can be configured to determine the duration of the said one time segment for energizing the inductor by implementing the following equation:

$$t_{up} = \sqrt{\frac{c}{a}} \text{ with } a = \frac{V_{DC}}{2 \cdot L_i}, \text{ and } c = I_{req} \cdot T_{cycle};$$

wherein $V_{DC}$ denotes a voltage of the electrical DC voltage source, $L_i$ denotes an inductance of the inductor, $I_{req}$ denotes the sum of currents suppliable to the plurality of loads, $t_{up}$ denotes the duration of the said one time segment, and $T_{cycle}$ denotes a predetermined duration of the cycle of operation.

The equation can be implemented in the digital controller. The controller solves the equation using the measured voltages, as set out in one of the embodiments before. This equation is valid if the SIMO DC-DC converter operated in discontinuous current mode. If it operates in continuous conduction mode, a lookup table can approximate the equation for the operation in continuous conduction mode. Alternatively, the following equation can be implemented in and can be solved by the digital controller:

$$t_{up} = \frac{-b + \sqrt{b^2 - (4 \cdot a \cdot c)}}{2 \cdot a} \text{ with } a = \frac{V_{DC}}{2 \cdot L_i},\ b = I_{det}, \text{ and } c = -I_{req} \cdot T_{cycle};$$

$V_{DC}$ denotes a voltage of the electrical DC voltage source, $L_i$ denotes an inductance of the inductor, $I_{det}$ denotes an inductor current remaining in the inductor before the start of the cycle of operation, $I_{req}$ denotes the sum of currents suppliable to the plurality of loads, $t_{up}$ denotes the duration of the said one time segment, and $T_{cycle}$ denotes a predetermined duration of the cycle of operation.

In a different embodiment of the first aspect of the invention, the SIMO DC-DC converter can be configured to determine the duration of a further time segment and/or a plurality of further time segments for de-energizing the inductor to provide a load with a current from the set of currents by implementing the following equation:

$$t_{down} = \frac{-b - \sqrt{b^2 - (4 \cdot a \cdot c)}}{2 \cdot a} \text{ with } a = \frac{V_{out}}{2 \cdot L_i},\ b = -I_{act}, \text{ and } c = I_{tar} \cdot T_{cycle},$$

wherein $V_{out}$ denotes a load voltage setpoint, $L_i$ denotes the inductance of the inductor, $I_{act}$ denotes an inductor current, $I_{tar}$ denotes a current demanded by the corresponding load, $t_{down}$ denotes the duration of the further time segment or segments, and $T_{cycle}$ denotes the predetermined duration of the cycle of operation.

Also this equation can be implemented in the digital controller. The digital controller solves the equation using the measured voltages, as set out in one of the embodiments before, and taking further setpoint or predetermined values or variables into account. For instance, the inductance of the inductor can be measured before it is installed in the SIMO DC-DC converter. The related inductance can be stored as a predetermined variable in the digital controller. Alternatively, or in addition, the digital controller can determine some of the variables. For instance, the digital controller can be configurated with further voltage sensors to measure the voltage of the electrical DC voltage source. The inductor current can be determined by measuring the voltage across the freewheeling resistor. A current sensor might be used instead of the freewheeling resistor to measure the inductor's current.

In a further embodiment of the first aspect of the invention, the voltage of the electrical DC voltage source, the inductance of the inductor, the predetermined duration of the cycle of operation, and/or the load voltage setpoint can be predetermined setpoints or variables of the digital controller. As outlined before, the value of the inductance, for instance, can be obtained by measurement.

In a different embodiment of the first aspect of the invention, the control structure of the SIMO DC-DC converter can comprise an analog circuit with a first capacitor, wherein a voltage of the first capacitor can be directly proportional to a current conducted by the inductor in the said one time segment. The analog circuit can be used instead of, or in concert with, the digital controller. When it is used in concert with the digital controller, it can provide the advantage of being more energy efficient than the pure implementation of the control loop with the digital controller, as the analog circuit enables the SIMO DC-DC converter to control the cycles of operation without the need of solving the equations, such as outlined herein before. The analog circuit is used as an alternative means to mimic the behavior of the inductor's current. Configuring the control circuit, in addition with the said analog components, can significantly reduce power consumption of the SIMO DC-DC converter, as said before, which is desirable for low-power applications. In addition, can the analog circuit also reduce or omit cross-regulation issues.

In a further embodiment of the first aspect of the invention, the duration of the said one time segment and of the further time segment and/or segments can be dependent on the voltage of the first capacitor. The voltage of the capacitor can mimic and can be directly proportional to the inductor's current tough the entire cycle of operation.

In another embodiment of the first aspect of the invention, the analog circuit can comprise a transconductor configured to convert the voltage of the first capacitor into a current for charging a second capacitor. Transductors are also referred to as transconductance amplifiers. The voltage of the first capacitor can mimic the inductor current, whereas the voltage of the second capacitor can mimic the current suppliable (or supplied) to the individual load. In summary, the voltage on the second capacitor can be an integrated version of the voltage on the first capacitor. So, this voltage on the second capacitor relates to the average value of the current required in a particular phase (energizing or de-energizing).

In a different embodiment of the first aspect of the invention, the analog circuit of the SIMO DC-DC converter can comprise a comparator for comparing the voltage of the second capacitor with a threshold, wherein the comparator can be configured to generate a pulse signal if the voltage of the second capacitor matches the threshold. The threshold can be provided by the digital controller and can account for the time required to supply the load (or loads) with a current or (or set of currents). The pulse signal can be used by a logic circuit for controlling the input switch, and the related output switched correspondingly.

Even though the individual embodiments of the first aspect cover different aspects of the invention, some or all embodiments can be combined when it is useful and feasible from a technical standpoint.

According to a second aspect of the present invention, a method for operating the SIMO DC-DC converter of the first aspect or any embodiments of the first aspect is disclosed.

The method comprises the steps of:

determining an actual current demand of the plurality of loads, wherein the actual current demand being the sum of the set of currents suppliable to the plurality of loads;

energizing the inductor for the duration of the said one time segment;

de-energizing the inductor by sequentially connecting the plurality of loads to the output node, wherein each load being connected for a duration of one further time segment to the output node, wherein the duration of the said one time segment being determined based on the actual current demand and being determined prior to each cycle of operation, and wherein the duration of each further time segment determined prior to each cycle of operation and being based on an actual current request of individual currents from the set of currents suppliable to the plurality of loads.

Further time segment or time segments can refer to being additional to the said one time segment. One cycle of operation can comprise the said one time segment and at least one further time segment. The actual current request can relate to the current required by the related load to keep the load voltage constant. Each cycle of operation can additionally comprise a time segment in which the residual inductor current can be determined. The said time segment can preferably be situated prior to the start of a cycle.

SHORT DESCRIPTION OF THE DRAWINGS

Exemplar embodiments of the invention are disclosed in the description and illustrated by the drawings in which.

EXAMPLES OF EMBODIMENTS OF THE PRESENT INVENTION

Figure 1:
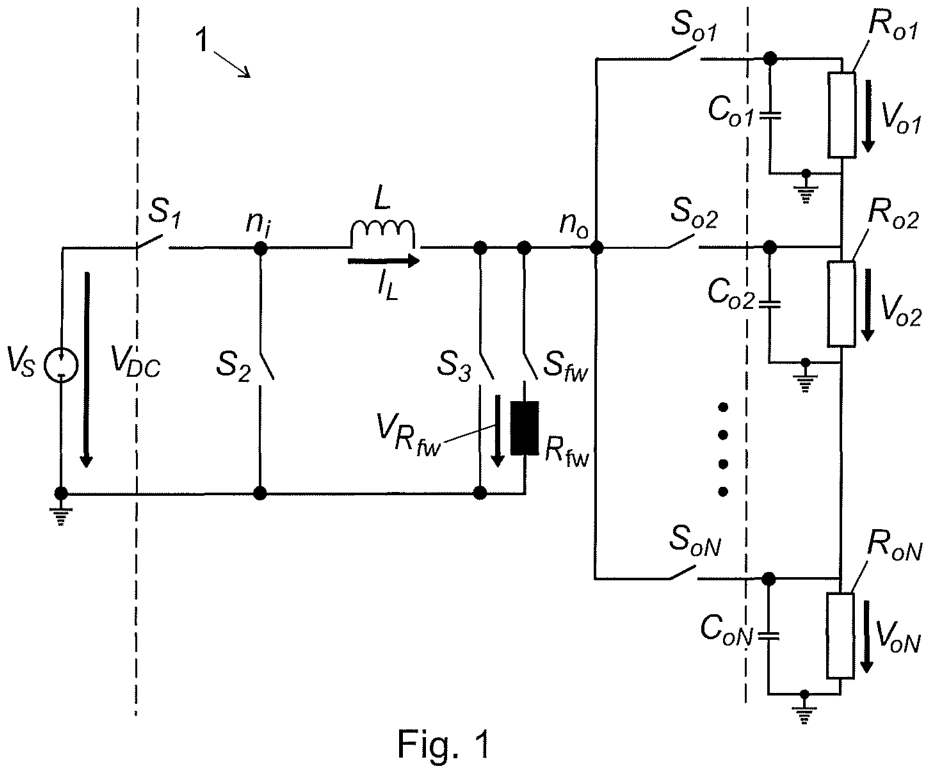
FIG. 1 illustrates a schematic diagram of a SIMO DCDC converter in buck-boost configuration according to one example of the invention.

FIG. 1 illustrates a schematic diagram of a SIMO DCDC converter 1 in a buck-boost configuration according to one example of the invention. All switches $S_1$, $S_2$, $S_3$, $S_{o1}$ . . . $S_{oN}$ are configurated as field-effect transistors with an ampacity of less than 100 mA. The voltage source $V_S$ supplies in this example a DC voltage with less than 5V. Therefore, the SIMO DCDC converter 1 is configured for low current, low power applications.

The voltage source $V_S$ and the loads $R_{o1}$ . . . $R_{oN}$ are preferably not part of the SIMO DCDC converter 1, which is indicated by the dashed lines. However, the output capacitors $C_{o1}$ . . . $C_{oN}$ can be part of the SIMO DCDC converter 1.

The SIMO DCDC converter 1 is operated as a non-inverting SIMO DCDC converter 1. As the term “non-inverting” already suggests, the output voltages $V_{o1}$ . . . $V_{oN}$ have the same polarity as the input voltage $V_{DC}$.

The input switches $S_1$, $S_2$ are used to selectively connect the input node $n_i$ to the positive or negative polarity of the voltage source $V_S$. The inductor L is connected to the input node $n_i$ and output node $n_o$. The output node $n_o$, in turn, can be selectively connected to a plurality of output capacitors $C_{o1}$ . . . $C_{oN}$. One load $R_{o1}$ . . . $R_{oN}$ is connected in parallel to one output capacitor of the plurality of output capacitors $C_{o1}$ . . . $C_{oN}$.

In the non-inverting buck operation of the SIMO DCDC converter 1, the first input switch $S_1$ and one or a sequence of output switches $S_{o1}$ . . . $S_{oN}$ are used to energizing the inductor L. The second input switch $S_2$, in return and in combination with one or a sequence of output switches $S_{o1}$ . . . $S_{oN}$ are used to de-energize the inductor L. The third input switch $S_3$ is opened (disabled) all the time. While the inductor L stores energy, a corresponding inductor current $I_L$ flows between the input node $n_i$ and the output node $n_o$.

In the non-inverting boost operation, the first input switch $S_1$ is closed (enabled) at all times, wherein the third input switch $S_3$ energizes the inductor L, while one or a sequence of output switches $S_{o1}$ . . . $S_{oN}$ de-energizes the inductor L. In greater detail, an example of the non-inverting boost operation will be discussed in FIG. 3.

As it can be noticed, the inductor L serves as an energy storing means for buffering energy that is shifted from the input node $n_i$ to the output node $n_o$. The SIMO DCDC converter 1 can also be used to shift energy in the reverse direction, thus from the output node $n_o$ to the input node $n_i$. The SIMO DCDC converter 1 can be operated in discontinuous conduction mode, in critical conduction mode or in continuous conduction mode, or a mixture of, depending on the energy required to be supplied to the output node $n_o$ and thus to the loads $R_{o1}$ . . . $R_{oN}$. The conduction mode corresponds to the energy that is stored in the inductor L. When the inductor L is completely de-energized in one cycle of operation, it is commonly referred to as discontinuous conduction mode. However, when energy remains in the inductor L, before starting a new cycle of operation, it is conventionally referred to as continuous conduction mode.

The freewheeling switch $S_{fw}$ is closed (activated) during one cycle of operation, preferably in the freewheeling period. While the freewheeling switch $S_{fw}$ is closed, the current flows through freewheeling shunt resistor $R_{fw}$, and a voltage drop can be determined across the freewheeling shunt resistor $R_{fw}$. The voltage determinable is proportional to the resistance of the freewheeling shunt resistor $R_{fw}$ and the current flowing through the freewheeling shunt resistor $R_{fw}$, and thus corresponds to the inductor current $I_L$. The freewheeling switch $S_{fw}$ in combination with the freewheeling shunt resistor $R_{fw}$ is used to measure the inductor current $I_L$ during one cycle of operation of the SIMO DCDC converter 1.

Figure 2:
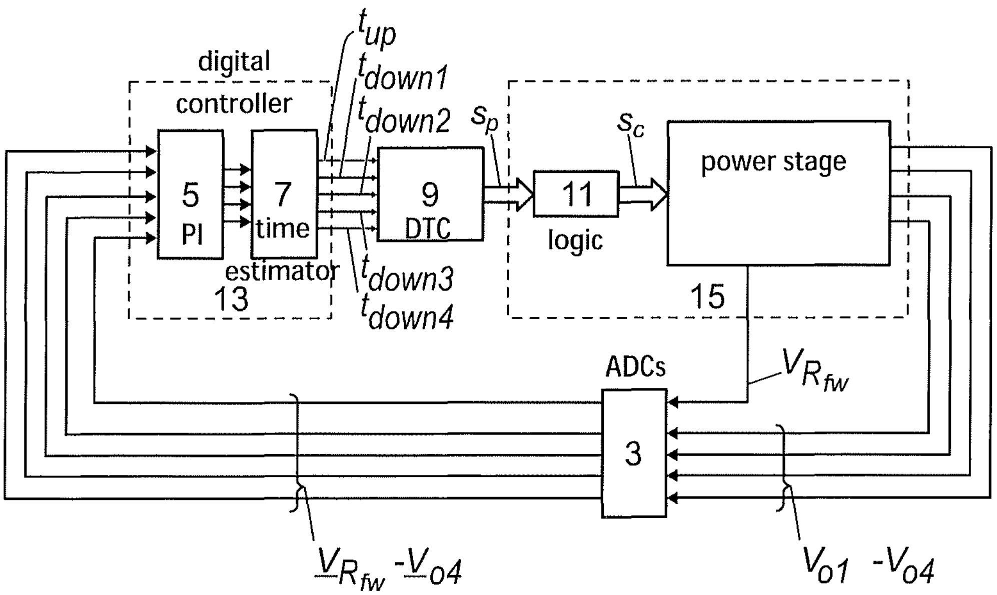
FIG. 2 shows schematically a control structure used for controlling the operation of the SIMO DCDC converter of FIG. 1.

FIG. 2 shows schematically a control structure used for controlling the operation of the SIMO DCDC converter 1 of FIG. 1. However, the SIMO DCDC converter 1 is configured with four outputs and related loads. The control structure consists of the control system, comprising the PI compensators 5, the time estimator 7, and the digital-to-time converter 9. The digital-to-time converter 9 receives the required times $t_{up}$ . . . $t_{down4}$ from the time estimator 7, for closing or opening the corresponding switches of the SIMO DCDC converter 1 in a digital format and converts the required times $t_{up} \ldots t_{down4}$ into corresponding logical signals $s_p$.

The control system in this example is implemented on a digital controller 13. The digital controller 13 operates at a frequency of about 5 MHz. The logic circuit 11 comprises a network of flip-flops for generating the gate control signals $s_c$ for the switches of the SIMO DCDC converter 1, based on the logical signal $s_p$ received from the time estimator 7. The logic circuit 11 and the components of the SIMO DCDC converter 1 are referred to as the power stage 15. The power stage 15 also provides a clock generator (not illustrated) which outputs a clock signal which is globally used as a clock reference. The clock signal frequency corresponds to the switching frequency of the switches of the SIMO DCDC converter 1 and accounts in this example to 5 MHz. Instead of using a dedicated clock generator, the clock of the digital controller 13 can be used globally. The digital-to-time converter 9, on the other hand, is clocked at a much higher frequency, such as 150 MHz or even higher, to generate signals based on the time for energizing and de-energizing the inductor. The clock for the digital-to-time converter 9 can originate from the clock of the digital controller and can be increased with a clock multiplier to the frequency as outlined before.

The output voltages $V_{o1} \ldots V_{oN}$ (load voltages) are measured with a plurality of voltage sensors connected to the output capacitors. The output voltages $V_{o1} \ldots V_{oN}$ and the freewheeling voltage $V_{Rfw}$ are digitalized with the use of analog-to-digital converters 3. The digitalized voltages $\underline{V}_{o1} \ldots \underline{V}_{oN}$, $\underline{V}_{Rfw}$ are fed into the digital controller 13 for further processing.

The SIMO DCDC converter 1 is controlled using a pulse—with modulation. Consequently, the SIMO DCDC converter 1 and the corresponding control structure is operated in cycles, wherein one cycle has a predetermined length, which is the reciprocal of the switching frequency (or the frequency of the clock signal) of the SIMO DCDC converter 1. Preferably, the switching frequency is predetermined and is not subject to be varied over the operation.

Figure 3:
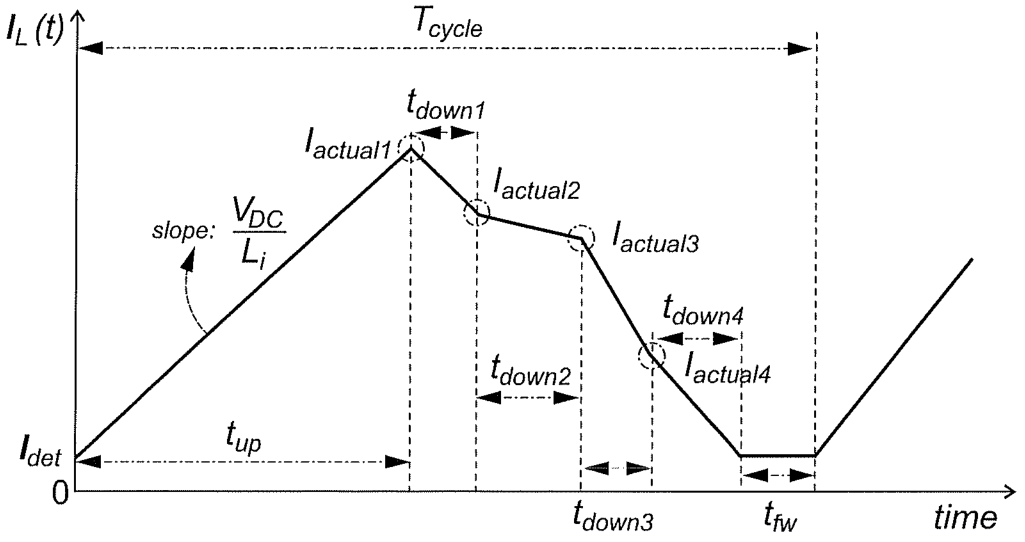
FIG. 3 illustrates a current profile of the inductor of the SIMO DCDC converter of FIG. 2, in one cycle of operation.

FIG. 3 illustrates a current profile of the inductor of the SIMO DCDC converter of FIG. 2, in one cycle of operation.

The SIMO DCDC converter is controlled by the control structure as of FIG. 2. In the following, the control for one cycle of operation will be explained in greater detail.

Before starting the cycle of operation, the actual output voltages are measured, digitalized and fed into the digital controller 13, along with the freewheeling voltage (the voltage determinable across the freewheeling resistor). The error voltages of the outputs are calculated based on a comparison between a voltage set point for each output and the corresponding actual output voltage. Each PI compensator estimates the current required for each output to keep the output voltage (load voltage) constant. The estimated currents are used by the time estimator 7 to evaluate the time required for each load to be connected to the output node, to de-energize the inductor for receiving a related output current.

The total time for energizing the inductor in the said cycle of operation, however, is estimated by the time estimator 7 based on the sum of the output current suppliable to the individual loads. The time associated with each output and for energizing the inductor is fed into the digital-to-time converter and is converted into the logic signals used by the logic circuit to generate the control signals for the switches. It can be noticed that pre-estimated time slots are assigned for each output, prior to the cycle of operation and thereby taking into account any load variation that occurred before the cycle of operation is started. This leads to an excellent stability of the voltages at the output, and cross-regulations performance issues are reduced or omitted.

The figure also illustrates the outcome of the before said. The inductor current $I_L$ over the time of one cycle $T_{cycle}$ is illustrated. As said, the cycle starts with the determination of the remaining current in the inductor, by closing the freewheeling switch for a short time. In this example the first and the third input switch are closed in the first phase for a first required time $t_{up}$. The inductor current $I_L$ begins to increase from the initial inductor current $I_{det}$ to the peak current $I_{actual1}$ with a slope that corresponds to the input voltage $V_{DC}$ over the inductance $L_i$ of the inductor. The peak current $I_{actual1}$ in this first phase can also be referred to as total current $I_{req}$. The second phase starts by opening the third input switch and closing the first output switch of the first output for a second required time $t_{down1}$ until the inductor current $I_L$ reaches a first threshold current $I_{actual2}$. Subsequently, the first output switch is opened, and the second output switch is closed for a third required time $t_{down2}$. The process continues for the remaining output switches, until the inductor current $I_L$ reaches the level of the initial inductor current $I_{det}$, whereby the initial inductor current $I_{det}$ can be zero. Alternatively, the process continues for the remaining output switches until the end of the cycle. In the last phase, the freewheeling phase, the second and third input switches are closed for a last required amount of time $t_{fw}$. The freewheeling phase, in its length or duration, depends on the load situation. If one of the outputs was skipped because the load at the related output doesn't require any energy in the form of a current, the freewheeling phase will be prolonged by the control structure. For the sake of efficiency, a long freewheeling phase should be avoided.

As indicated, are the required times $t_{up}$–$t_{down4}$ calculated or estimated by the time estimator. The time for energizing the inductor, corresponding to the first phase as explained before, and is calculated as follows:

If $I_{req}$ denotes the total current (as determined by the PI compensator) required by the inductor to be supplied to all the outputs in one cycle, then the time for energizing the inductor $t_{up}$ can be determined by:

$$I_{req} \cdot T_{cycle} = I_{det} \cdot t_{up} + \frac{V_{DC} \cdot (t_{up})^2}{2 \cdot L_i}. \tag{1}$$

Under the assumption that the initial inductor current $I_{det}$ is zero (discontinuous conduction mode), the equation can be further simplified, and the time for energizing for the inductor $t_{up}$ can be calculated by:

$$t_{up} = \sqrt{\frac{c}{a}} \text{ with } a = \frac{V_{DC}}{2 \cdot L_i}, \text{ and } c = I_{req} \cdot T_{cycle}. \tag{2}$$

Even though this equation (2) was simplified by assuming the discontinuous conduction mode, it also works in continuous conduction mode, as the PI compensators help to compensate for the deviation. Alternatively, can the digital controller use a lookup table to approximate the equation (2) for the continuous conduction mode, which is energy efficient. In conclusion, the equation (2) can be efficiently implemented in the digital controller 13.

The input voltage $V_{DC}$ and the inductance $L_i$ are predetermined constants in the digital controller 13. Even when the input voltage $V_{DC}$ slightly variates over time, the PI compensators can compensate for the variation.

The times for de-energizing the inductor $t_{down1}$–$t_{down3}$ for the phases of the three outputs are calculated similarly in the digital controller 13 or in the time estimator 7 respectively, by solving the equation:

$$t_{downN} = \frac{-b - \sqrt{b^2 - (4 \cdot a \cdot c)}}{2 \cdot a} \text{ with } a = \frac{V_{outN}}{2 \cdot L_i}, \quad b = -I_{actualN}, \text{ and } c = I_{tarN} \cdot T_{cycle}, \tag{3}$$

wherein $I_{tarN}$ corresponds to the current that is outputted by the related PI compensator of the related output, and $V_{outN}$ denotes the voltage required at the output of the corresponding load. The time required for de-energizing the inductor in the last phase is calculated by solving the following equation:

$$t_{downLast} = \frac{I_{tarLast} \cdot L_i}{V_{outLast}}. \tag{4}$$

The last (fourth) switch is closed until the inductor current reaches zero and the freewheeling phase is entered, or the end of the cycle has reached, such as in continuous conduction mode.

One can notice that the time for the freewheeling phase is not specifically calculated or determined. If the last phase ends before the end of the cycle of operation, the freewheeling phase is automatically entered by the digital controller 13. The same applies if the current is not zero, as the SIMO DCDC converter is operated in the continuous conduction mode. If the current supplied in the last phase to the fourth output is more than what was required, the PI comparators adjust the required current for the next cycle of operation accordingly.

In some cases the input voltage $V_{DC}$ can be variable, in particular if a battery is used as a voltage source. In this situation is a predefined value for the input voltage $V_{DC}$ not sufficient. The said input voltage $V_{DC}$ can be precisely estimated by capitalizing on the fact that the output voltages are measured, and the time for energizing and de-energizing the inductor is calculated by adjusting the timings with the use of the PI compensators. The input voltage $V_{DC}$ can be expressed by:

$$V_{DC} = \frac{V_{o1} \cdot t_{down1} + \ldots + V_{oN} \cdot t_{downN}}{t_{up}}. \tag{5}$$

Figure 8:
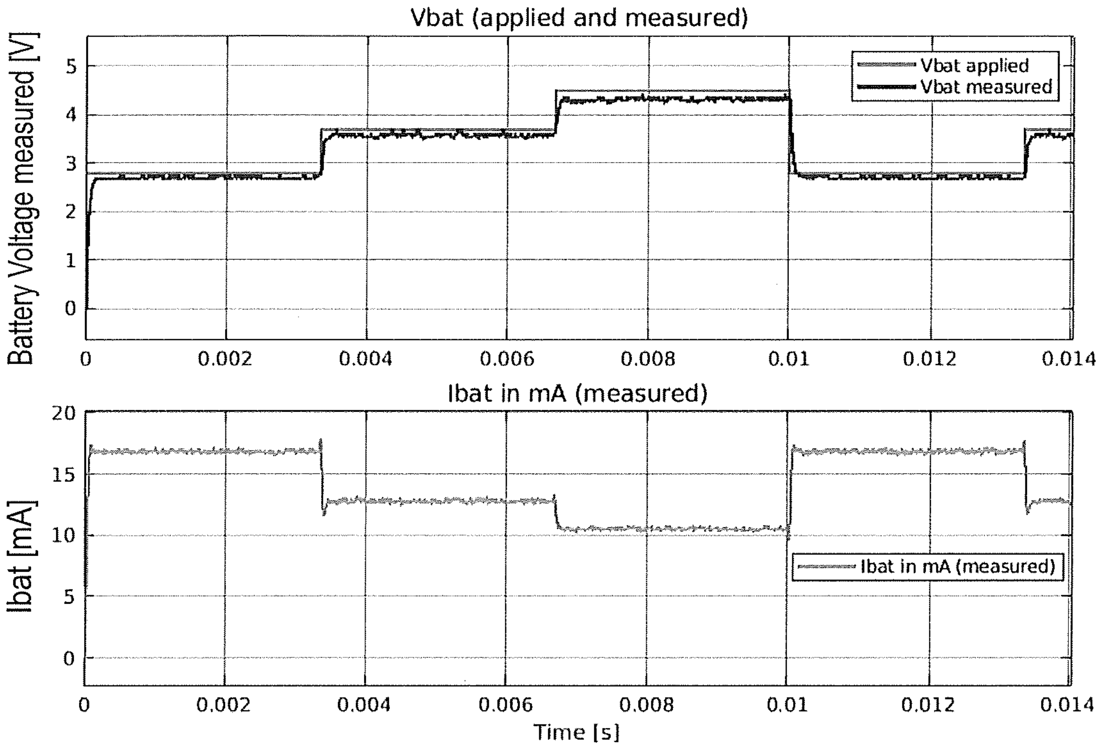
FIG. 8 shows the measured and calculated battery voltage over time.

The equation (5) can benefit from the estimation of the input voltage $V_{DC}$ and therefore for calculating the time associated with the first phase $t_{up}$. FIG. 8 illustrates the application of the equation (5). In the top diagram, the battery voltage is measured and compared with the battery voltage as calculated using equation (5) (referred to as Vbat applied). It can be noticed that the calculated battery voltage almost perfectly approximates the course of the measured battery voltage over time. The measured battery current also is illustrated in the bottom chart over time.

Figure 4:
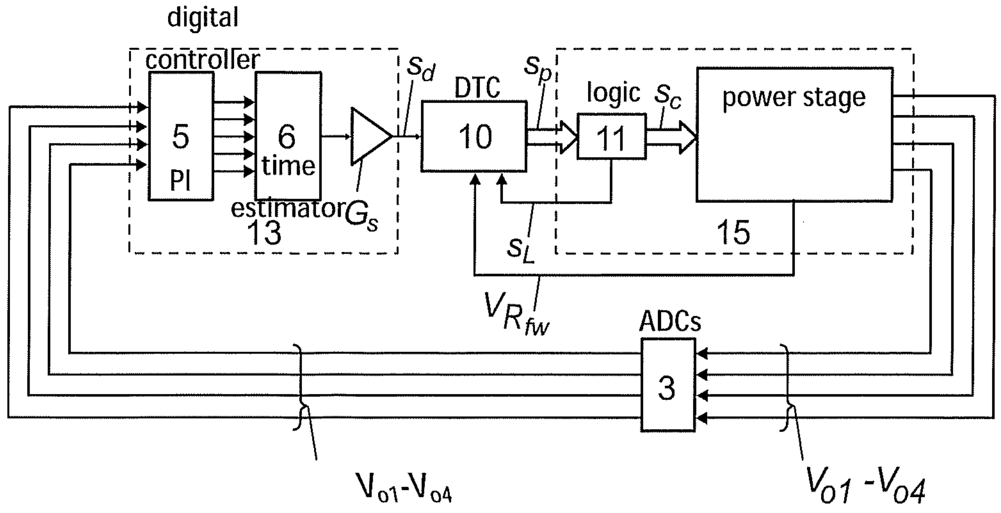
FIG. 4 illustrates schematically a variant of the control structure of FIG. 2, for controlling the SIMO DCDC converter of FIG. 1.

FIG. 4 illustrates schematically a variant of the control structure of FIG. 2, for controlling the SIMO DCDC converter, leading to an inductor current profile, almost identical to the profile as illustrated in FIG. 3.

The control structure is split into both analog and digital domains. The control structure consists of the part of the control system operating in digital domain, comprising the PI compensators 5, the signal multiplexer 6, and a gain $G_s$. The part of the control circuit operating in analog domain comprises the average-to-time generator 10, the logic circuit 11, and the SIMO DCDC converter 1. The average-to-time generator 10 receives sequentially within a cycle of operation from the gain $G_s$ a voltage signal $s_d$ that corresponds to the required times $t_{up}$ . . . $t_{down4}$ multiplied by the square root of the required current, for energizing and de-energizing the inductor of the SIMO DCDC converter 1. The average-to-time generator 10 receives for each phase (each energizing and each de-energizing phase) a new voltage signal $s_d$, and thus operates in a time-multiplexed like manner. The PI compensators operate equivalently, as explained in FIG. 2.

The average-to-time generator 10 converts the voltage signals $s_d$ supplied from the digital controller 13 into a corresponding logical signal $s_p$, which is further processed in the logic circuit 11. The logic circuit 11 again comprises a network of flip-flops for generating the gate control signals $s_e$ for the switches of the SIMO DCDC converter 1, based on the logical signal $s_p$ received from the average-to-time generator 10. The logic circuit 11 and the components of the SIMO DCDC converter 1 are referred to the power stage 15. The power stage 15, again, comprises the clock generator (not illustrated), which outputs a clock signal which is globally used. The frequency of the clock signal corresponds to the switching frequency of the switches of the SIMO DCDC converter 1, and accounts in this example also to 5 MHz. The part of the control structure operating in the digital domain on the digital controller 13, operates at a similar frequency, which accounts for around 5 MHz.

The output voltages $V_{o1}$ . . . $V_{oN}$ (load voltages) are measured with a plurality of voltage sensors connected to the output capacitors. The output voltages $V_{o1}$ . . . $V_{oN}$ are digitalized with the use of analog-to-digital converters 3. The digitalized voltages $\underline{V}_{o1}$ . . . $\underline{V}_{oN}$ are fed into the digital controller 13 for further processing and adapting using the PI compensators 5. The freewheeling voltage $V_{Rfw}$ on the other hand, is directly fed as an analog signal into the average-to-time generator 10. The SIMO DCDC converter 1 is controlled using pulse-width modulation. Consequently, the SIMO DCDC converter 1, and the corresponding control structure is operated in cycles, wherein one cycle has a predetermined length, which is the reciprocal of the switching frequency of the SIMO DCDC converter 1. Preferably, the switching frequency is predetermined and is not subject to be varied over the operation of the SIMO DCDC converter 1.

Figure 5:
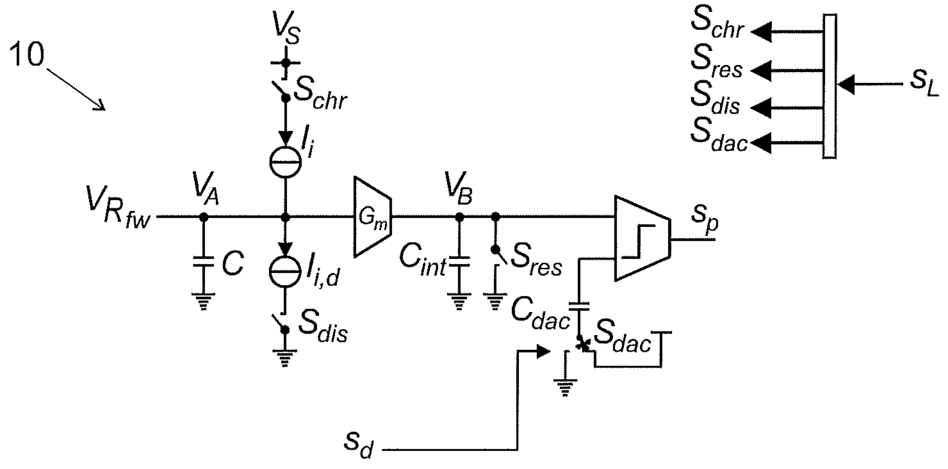
FIG. 5 illustrates the timing circuit of FIG. 4 schematically.

FIG. 5 illustrates the timing circuit of FIG. 4 schematically, in particular, the average-to-time generator 10 is illustrated. All statements made in this example concerning the cycle of operation shall be seen in conjunctions with the cycle of operation as illustrated in FIG. 3.

The circuit comprises multiple electronic and circuit elements, such as switches $S_{chr}$, $S_{dis}$, $S_{dac}$, $S_{res}$, capacitors C, $C_{int}$, $C_{dac}$, current sources $I_i$, $I_{id}$, and a transconductor $G_m$. The average-to-time generator 10 as disclosed in the present figure, is used as an alterative means to the combination of the time estimator and digital-to-time converter as of FIG. 2. The basic idea utilizes on the fact, that an inductor and a capacitor can generate a linearized signal, with a predeterminable slope. The inductor can generate a linear current signal when connected to a DC voltage source, whereby the capacitor generates a linear voltage signal when connected to a DC current source. Under the assumption that the inductor of the SIMO DCDC converter of FIG. 4 is not entirely de-energized during the last phase of an operation cycle (corresponding to $t_{down4}$ in FIG. 3), the average current $I_{L,avg}$ for the duration $t_1$ of the energizing phase can be expressed by:

$$I_{L,avg}(t_1) = \frac{1}{T_{cycle}}\left(\frac{V_{DC}}{2L_i}\cdot t_1^2 + I_{left}\cdot t_1\right),\text{ wherein} \tag{6}$$

$I_{left}$ denotes the current left in the inductor at the end of the de-energizing phase/freewheeling phase. On a similar line, the average voltage of a capacitor $V_{C,avg}$ can be expressed by:

$$V_{C,avg}(t_1) = \frac{1}{T_{cycle}}\left(\frac{I_{DC}}{2C_i}\cdot t_1^2 + V_{C,ini}\cdot t_1\right),\text{ wherein} \tag{7}$$

$C_i$ denoted the capacitance of the capacitor, $V_{c,init}$ denotes the initial voltage of the capacitor, and $I_{DC}$ denotes the current which flows into the capacitor C. Under the assumption that the ratio between the initial capacitor voltage $V_{c,init}$ it and the remaining current in the inductor $I_{left}$ is equal to ($I_{DC}\cdot L_i$) over ($V_{DC}\cdot C_i$), the average voltage of a capacitor $V_{C,avg}$ is given by:

$$V_{C,avg}(t_1) = \frac{I_{DC}\cdot L_i}{V_{DC}\cdot C_i}\cdot I_{L,avg}(t_1). \tag{8}$$

In other words, if the current as left in the inductor is converted into the initial voltage of the capacitor, with the use of a resistor whose value is ($I_{DC}\cdot L_i$) over ($V_{DC}\cdot C_i$), then the average value of the inductor current at a given time and the average value of the voltage on the capacitor are interrelated and can be equal to ($I_{DC}\cdot L_i$) over ($V_{DC}\cdot C_i$). This analogy can also be applied and is valid for the phase of de-energizing the inductor. Any variation by the resistor can be compensated by the loop gain.

This means, that the capacitor voltage needs to be changed based on or being equivalent to the peak current that is reached by the inductor at the end of the phase for energizing the inductor (corresponding to $t_{up}$ in FIG. 3). The average-to-time generator 10 as illustrated makes use of this analogy.

Before the cycle of operation starts, the freewheeling switch of the SIMO DCDC converter of FIG. 4 or FIG. 2 is closed. The capacitor C is therefore charged to the voltage, that is directly proportional to the current that can be remained in the inductor during the freewheeling phase (corresponding to $t_{fw}$ in FIG. 3). However, the current and corresponding voltage across the capacitor C can account to zero, if the SIMO DCDC converter operates in discontinuous conduction mode.

The currents of the current sources $I_i$, $I_{id}$ are integrated onto the capacitor (pre-charged as outlined before). The switch $S_{chr}$ of the upper current source $I_i$ is closed during the phase for energizing the inductor of the SIMO DCDC converter of FIG. 4. The voltage of the capacitor C increases accordingly. Correspondingly the switch $S_{dis}$ of the lower current source $I_{id}$ is closed during the phase of de-energizing the inductor of the SIMO DCDC converter, wherein the voltage of the capacitor C decreases accordingly. The current providable by the current sources are design specific, and will be set in the design phase specifically. The currents can range between 5 μA and 20 μA, whereby the current for the lower current source $I_{id}$ will be smaller than for the upper current source $I_i$, when the SIMO DCDC converter is specifically designed for buck operation.

It can be noticed that the inductor current is mimicked with the use of the voltage across the capacitor C. The voltage on the capacitor C is converter into an equivalent or proportional current by the transconductor $G_m$, to supply the integration capacitor $C_{int}$. When the voltage on the integration capacitor $C_{int}$ reaches the voltage signals $s_d$ as supplied by the digital controller 13, the comparator triggers an output pulse which indicates the end of the particular phase, which can be the phase for energizing or one of the phases for de-energizing the inductor onto one of the outputs or loads. The output pulse corresponds to the logical signals $s_p$ that is provided to and used by the logic circuit of FIG. 4 to control the switches of the SIMO DCDC converter. After each phase, the voltage across the integration capacitor $C_{int}$ is set to zero by sequentially closing and opening the reset switch $S_{res}$. The signals used for operating the switches $S_{chr}$, $S_{dis}$, $S_{dac}$, $S_{res}$, originate from the said logic circuit and can correspond to the states of the switches of the SIMO DCDC converter. However, it is also possible that the signals are provided by the digital controller 13 acting in this case as an overarching control instance.

To describe the operation of the average-to-time generator 10 in greater detail, it is assumed that a cycle of operation starts with the freewheeling phase, when the inductor is freewheeled across the freewheeling resistor comprised in the SIMO DCDC converter. The voltage across freewheeling resistor is sampled onto the capacitor C, and subsequently, the energizing phase starts, where the inductor is connected to the voltage source with the use of the input switches. At the same time, the switch $S_{chr}$ is closed, and the voltage on the node $V_A$ starts to rise. Once the end of energizing phase signal is outputted by the comparator (based on the required charge current average), the de-energizing phase begins when the inductor starts charging the outputs one by one sequentially. When the energizing phase ends, the switch $S_{chr}$ is opened, and $S_{dis}$ is closed. The voltage on node $V_A$ linearly decreases and mimics the profile of the current in the inductor during the de-energizing phase.

Based on the average current required by each of the phases, the end of phase signals are generated accordingly. For the last de-energizing phase (corresponding to $t_{down4}$ in FIG. 3), the average-to-time converter remains silent, and the inductor is allowed to discharge completely until the end of the cycle of operation whether in continuous conduction mode or until the inductor current becomes zero as in discontinuous conduction mode (a zero crossing detector is needed in this case). Then again, the cycle of operation repeats, starting with the freewheeling phase.

Figure 6:
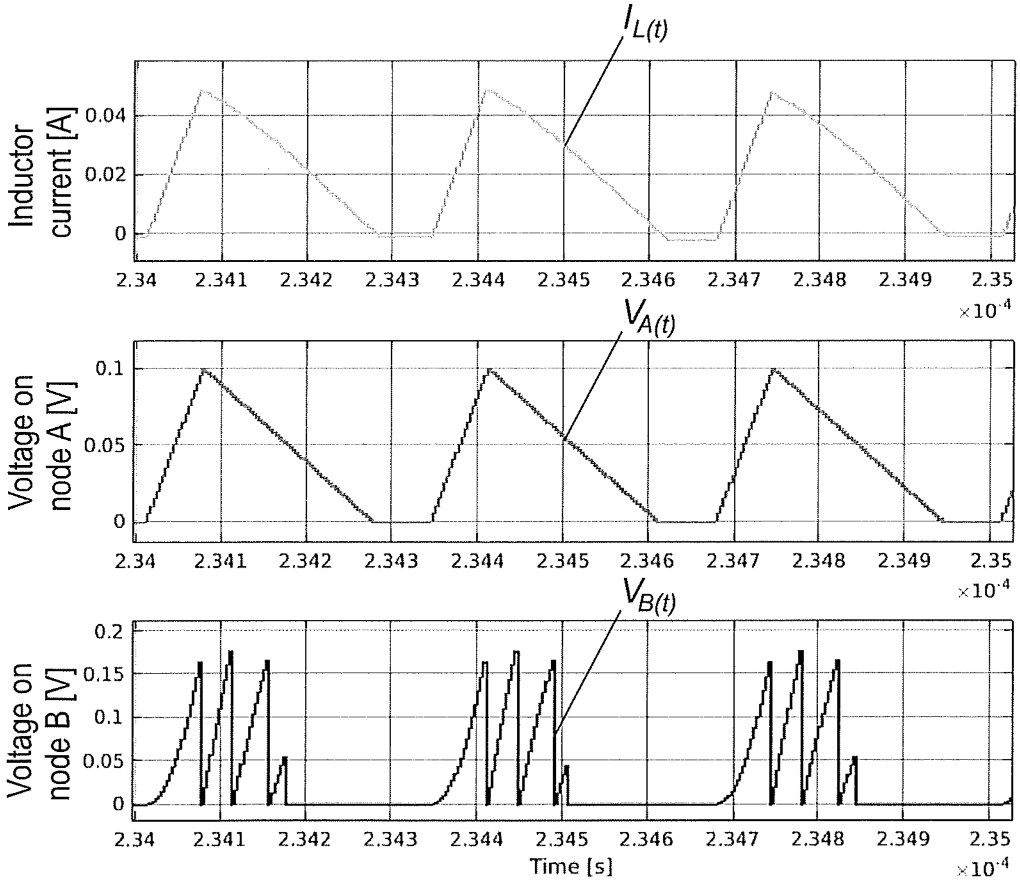
FIG. 6 illustrates the signals of the timing circuit of FIG. 5 and a corresponding inductor current, over multiple cycles of operation, in discontinuous conduction mode.

FIG. 6 illustrates the node voltages $V_A$, $V_B$ of the average-to-time generator 10 of FIG. 5 and a corresponding inductor current $I_L$(t), over multiple cycles of operation. The top diagram illustrates the inductor current $I_L$(t) over three cycles of operations of the SIMO DCDC converter of FIG. 4 or FIG. 2. The SIMO DCDC converter obviously is operated in discontinuous conduction mode, as the inductor current $I_L$(t) starts at zero in every operation cycle.

The inductor current $I_L$(t) first increases and then decreases as the inductor is de-energized to the plurality of outputs. The slope of the decreasing line is not constant and varies, dependent on the current (energy) that is demanded by each output (load). The centered diagram illustrates the node voltage $V_A(t)$, which corresponds to the voltage across the capacitor C, as of FIG. 5. It can be noticed that the voltage perfectly mimics the course of the inductor current $I_L(t)$. The bottom diagram illustrates the node voltage $V_B(t)$ overtime. It can be seen that a voltage in the form of a sawtooth is illustrated. The first spike (or tooth) corresponds to the energizing phase of the inductor, and the remaining spikes (or teeth) relate to the de-energizing phase, wherein multiple loads are supplied with the energy stored in the inductor during the energizing phase.

Figure 7:
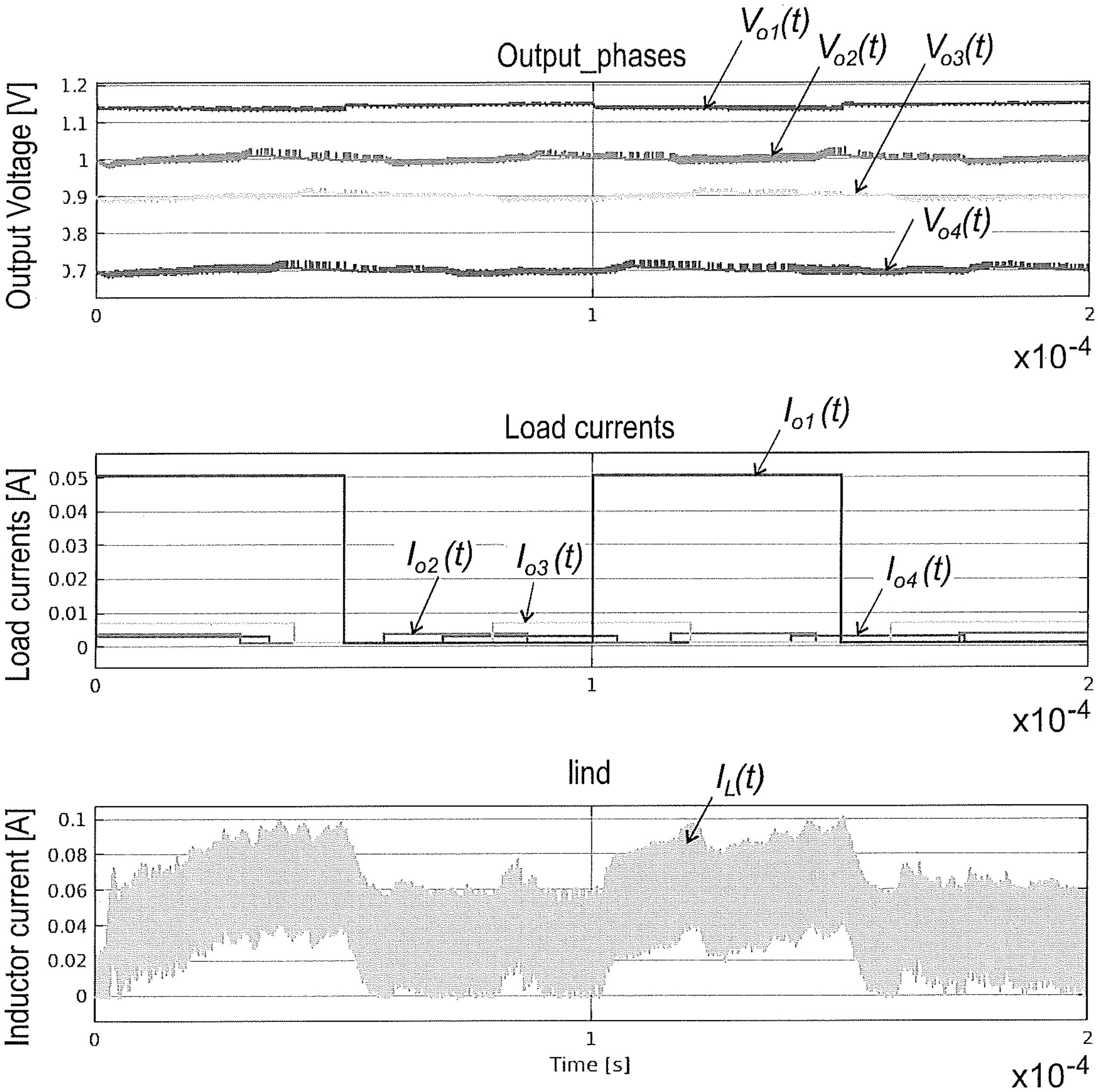
FIG. 7 shows the load voltages at the output and the current profile of the inductor of the SIMO DCDC converter of FIG. 1, dependent on a load variation, wherein the SIMO DCDC converter is controlled by the control structure as illustrated in FIG. 2 or 4.

FIG. 7 shows the load voltages at the output and the current profile of the inductor of the SIMO DCDC converter of FIG. 1, dependent on a load variation, wherein the SIMO DCDC converter is controlled by one of the control structure illustrated in FIG. 2 or 4. The diagram on the top illustrates the individual output voltages $V_{o1}(t) \ldots V_{o4}(t)$ over time, measured at each load, whereby the SIMO DCDC converter of FIG. 1 is configured with four loads. Even though the individual load currents $I_{o1}(t) \ldots I_{o4}(t)$ are significantly varied over time, as illustrated in the centered diagram, remain the individual output voltages $V_{o1}(t) \ldots V_{o4}(t)$ almost constant. This is a strong indication that the control structures provide an excellent regulation performance without any indications for cross-regulation issues. The inductor current $I_L(t)$ of the SIMO DCDC converter over time is illustrated in the bottom diagram. It can be noticed that the SIMO DCDC converter varies the operation mode from continuous conduction mode to discontinuous conduction mode (and vice versa) depending on the level of load currents $I_{o1}(t) \ldots I_{o4}(t)$.

REFERENCE SYMBOLS IN THE FIGURES

1 SIMO DCDC converter
3 Analog-to-digital converters (ADCs)
5 Proportional-integral-derivative (PI) compensators
6 Signal multiplexer
7 Time estimator (digital)
9 Digital-to-time converter
10 Average-to-time generator (analog)
11 Logic circuit
13 Digital controller
15 Power stage
$C_{o1} \ldots C_{oN}$ Output capacitors
$G_m$ Transconductor
$I_{actualN}$ Actual inductor current
$I_{det}$ Starting inductor current
$I_L$ Inductor current
$I_{oN}$ Load currents, output currents
L Inductor
$n_i$ Input node
$n_o$ Output node
$R_{fw}$ Freewheeling shunt resistor
$R_{o1} \ldots R_{oN}$ Loads, load devices
$S_{fw}$ Freewheeling switch
$S_1$, $S_2$, $S_3$ Input switches
$S_{o1} \ldots S_{oN}$ Output switches
$S_{LABELED}$ Switches average-to-time generator
$S_{LABELED}$ Signals
$t_{LABELED}$ Times for activation of the switches
$V_A$, $V_B$ Node voltages
$V_S$, $V_{DC}$ Source voltage, input voltage
$V_{o1} \ldots V_{oN}$ Load voltages, output voltages
$V_{Rfw}$ Freewheeling voltage
$\underline{V}_{LABELED}$ Digitalized voltage, digitalized voltage signal

The invention claimed is:

1. Single-inductor multiple-output (SIMO) DC-DC converter, comprising:
- an electrical DC voltage source connected to an input node through an input switch;
- a plurality of loads each being connected to an output node through one output switch of a plurality of output switches, wherein the electrical DC voltage source and the loads are external to the SIMO DC-DC converter;
- an inductor connected to the input node and the output node and being configured to buffer energy;
- a control structure arranged to operate in consecutive cycles and generate control signals for the input switch and the output switches, sectioning the cycle of operation into a plurality of consecutive time segments, each with a duration, wherein in one time segment the inductor is energized, wherein the control structure includes a time estimator configured to evaluate and calculate, prior to a start of the cycle of operation, for each output a suppliable output current required to keep the corresponding load voltage constant and a corresponding discharge time,
- the control structure being configured to:
  - determine, prior to a start of the cycle of operation, an actual current demand of the plurality of loads that is the sum of the suppliable output currents and a duration of the one time segment based on the actual current demand,
  - energize the inductor (L) through the input switch for the duration of the one time segment;
  - de-energize the inductor by sequentially connecting each load to the output node, for the corresponding discharge time.

2. The SIMO DC-DC converter of claim 1, the SIMO DC-DC converter being configured as buck-boost converter.

3. The SIMO DC-DC converter of claim 1, wherein the control structure is configured to operate the inductor in discontinuous or continuous conduction mode, dependent on the actual current demand, and wherein the consecutive cycles of operation having a predetermined duration.

4. The SIMO DC-DC converter of claim 1, wherein the control structure is configured to determine the duration of further time segments based on individual suppliable output currents.

5. The SIMO DC-DC converter of claim 1, comprising a resistor connected in parallel to the inductor through an inductor switch for measuring an inductor current.

6. The SIMO DC-DC converter of claim 5, comprising a first voltage sensor configured to determine a voltage across the resistor, and a plurality of second voltage sensors, each being configured to determine one load voltage of a plurality of load voltages.

7. The SIMO DC-DC converter of claim 1, the control structure being arranged to energize the inductor by controlling the input switch from a non-conductive state into a conductive state and de-energize the inductor by sequentially controlling the output switches from a non-conductive state into a conductive state for supplying the loads with a set of currents within each cycle of operation, wherein the amperage of individual currents from the set of currents being mutually different.

8. The SIMO DC-DC converter of claim 6, wherein the control structure comprises a digital controller adapted to receive the load voltages from the second voltage sensors.

9. The SIMO DC-DC converter of claim 8, wherein the digital controller comprises a plurality of PI compensators, wherein each PI compensator being configured to compensate a deviation between a load voltage and a corresponding load voltage setpoint.

10. A single-inductor multiple-output (SIMO) DC-DC converter, comprising:

an electrical DC voltage source connected to an input node through an input switch;

a plurality of loads each being connected to an output node through one output switch of a plurality of output switches, wherein the electrical DC voltage source and the loads are external to the SIMO DC-DC converter;

an inductor connected to the input node and the output node, configured to buffer energy;

a control structure arranged to operate in consecutive cycles, configured to generate control signals for the input switch and the output switches, whereby the inductor is energized and de-energized in one cycle of operation for supplying the plurality of loads with a set of currents within the said cycle of operation, the control structure being configured to section the cycle of operation into a plurality of consecutive time segments, each with a duration, wherein in one time segment the inductor is energized, wherein the duration of the one time segment is determined by the control structure prior to a start of the cycle of operation, a resistor connected in parallel to the inductor through an inductor switch for measuring an inductor current, a first voltage sensor configured to determine a voltage across the resistor, a plurality of second voltage sensors, each being configured to determine one load voltage of a plurality of load voltages, a digital controller in the control structure, adapted to receive the load voltages from the second voltage sensors, a plurality of PI compensators, each PI compensator being configured to compensate a deviation between a load voltage and a corresponding load voltage setpoint, the digital controller being configured to determine the duration of the said one time segment for energizing the inductor by implementing the following equation:

$$t_{up} = \sqrt{\frac{c}{a}} \text{ with } a = \frac{V_{DC}}{2 \cdot L_i}, \text{ and } c = I_{req} \cdot T_{cycle};$$

where $V_{DC}$ denotes a voltage of the electrical DC voltage source, $L_i$ denotes an inductance of the inductor, $I_{req}$ denotes the sum of currents suppliable to the plurality of loads, $t_{up}$ denotes the duration of the said one time segment, and $T_{cycle}$ denotes a predetermined duration of the cycle of operation.

11. The SIMO DC-DC converter of claim 10, the digital controller being configured to determine the duration of a further time segment and/or a plurality of further time segments for de-energizing the inductor to provide a load with a current from the set of currents by implementing the following equation:

$$t_{down} = \frac{-b - \sqrt{b^2 - (4 \cdot a \cdot c)}}{2 \cdot a} \text{ with } a = \frac{V_{out}}{2 \cdot L_i}, \ b = -I_{act}, \text{ and } c = I_{tar} \cdot T_{cycle},$$

wherein $V_{out}$ denotes a load voltage setpoint, $L_i$ denotes the inductance of the inductor, $I_{act}$ denotes an inductor current, $I_{tar}$ denotes a current demanded by the corresponding load, $t_{down}$ denotes the duration of the further time segment or segments, and $T_{cycle}$ denotes the predetermined duration of the cycle of operation.

12. The SIMO DC-DC converter of claim 11, wherein the voltage of the electrical DC voltage source, the inductance of the inductor, the predetermined duration of the cycle of operation, and/or the load voltage setpoint are predetermined setpoints of the digital controller.

13. The SIMO DC-DC converter of claim 11, the duration of the said one time segment and of the further time segment and/or segments depend on the voltage of the first capacitor.

14. The SIMO DC-DC converter of claim 10, wherein the control structure comprises an analog circuit with a first capacitor whose voltage is directly proportional to a current conducted by the inductor in the said one time segment, and a transconductor configured to convert the voltage of the first capacitor into a current for charging a second capacitor.

15. The SIMO DC-DC converter of claim 14, wherein the analog circuit comprises a comparator configured to generate a pulse signal if the voltage of the second capacitor matches the threshold.

* * * * *